US006361689B1

(12) United States Patent
Munzing

(10) Patent No.: US 6,361,689 B1
(45) Date of Patent: Mar. 26, 2002

(54) MAGNETIC APPARATUS FOR TREATING FLUID FUELS

(75) Inventor: Jurgen Munzing, Gloggnitz (AT)

(73) Assignee: Oko-Spin Klemenz, Lucke Und Munzing Ohg, Giesen (DE)

( * ) Notice: Subject to any disclaimer, the term of this patent is extended or adjusted under 35 U.S.C. 154(b) by 0 days.

(21) Appl. No.: 09/557,328

(22) Filed: Apr. 24, 2000

Related U.S. Application Data

(63) Continuation-in-part of application No. PCT/AT98/00249, filed on Oct. 19, 1998.

(30) Foreign Application Priority Data

Oct. 22, 1997 (AU) ........................................ A 1787/97

(51) Int. Cl.[7] ............................................... B01D 35/06

(52) U.S. Cl. ...................... 210/222; 123/538; 137/803; 210/198.1; 210/243

(58) Field of Search ................................ 210/198, 222, 210/223, 243, 695; 123/536, 538; 137/803

(56) References Cited

U.S. PATENT DOCUMENTS 4,414,951 A * 11/1983 Saneto ...................... 123/538
4,611,615 A * 9/1986 Petrovic ..................... 210/222
5,468,378 A * 11/1995 de la Barreiro ............. 210/222
5,882,514 A * 3/1999 Fletcher ...................... 210/222

FOREIGN PATENT DOCUMENTS

| | | |
|---|---|---|
| DE | 88 05 570.1 | * 9/1988 |
| EP | 0277112 A | * 8/1988 |
| JP | 7-318041 | * 12/1995 |
| WO | WO 97 01702 A | * 1/1997 |

* cited by examiner

*Primary Examiner*—Joseph W. Drodge
(74) *Attorney, Agent, or Firm*—Thomas R. Vigil

(57) ABSTRACT

A magnetic treatment device for fluid fuels, which exhibits a cylindrical flow chamber (6) with a conical part (17) widening in the direction of flow (A) and a conical, magnetic insert (16) with at least two flat and/or annular permanent magnets (10,11,12,13) arranged axially at a distance from each other, whereby the magnetic insert is held against the direction of flow with a force, e.g. intrinsic weight and/or the force from a spring and is mounted in the region of the conical part in such a manner that it can be moved axially, and in which the permanent magnets (10,11,12,13) are held at a distance from each other by spacing rings (14) or discs made from non-ferromagnetic material which are placed only in an inner region, between mutually facing surfaces of the permanent magnets, and a bearing shoulder (19) is allocated to at least one permanent magnet (10,12) in the wall of the conical part (17) of the flow-chamber (6).

13 Claims, 2 Drawing Sheets

MAGNETIC APPARATUS FOR TREATING FLUID FUELS

This application is a continuation-in-part of international application number PCT AT/98/00249, filed Oct. 19, 1998 (pending).

BACKGROUND OF THE INVENTION

The invention discloses a magnetic treatment device for fluid fuels, which exhibits a cylindrical flow chamber with a conical part widening in the direction of flow and a conical, magnetic insert with at least two fiat and/or annular, permanent magnets arranged axially at a distance from each other, whereby the magnetic insert is held against the direction of flow with a force, e.g. intrinsic weight and/or the force from a spring and is mounted in the region of the conical part in such a manner that it can be moved axially.

A cylindrical treatment device for the treatment of liquid mineral oil products, which is to be used particularly for preventing deposits of paraffin and other substances on pipe walls, is known from U.S. Pat. No. 4,611,615A. The use of permanent magnets in conjunction with regions of turbulence in the fluid is known from this document.

A treatment device of the type named in the introduction is disclosed in EP 0 277 112 A3 of the applicant; this represents a further development in that the moving magnetic insert described there allows adaptation to different flow-quantities and achieves results with both very small and relatively large flow volumes.

SUMMARY OF THE INVENTION

One object of the invention is to improve further the effect of known magnetic treatment devices especially for fluid fuels, such as petrol or diesel fuel, not least with the aim of reducing the fuel consumption and quantity of exhaust gas from engines, and especially in the case of diesel engines, the output of soot, by means of appropriately treated fuels.

In accordance with the invention, this object is resolved in that the permanent magnets are held at a distance from each other by spacing rings or discs made from non-ferromagnetic material placed only in an inner region between mutually facing surfaces of the permanent magnets, and that a bearing shoulder in the wall of the conical part of the flow-chamber is allocated to at least one permanent magnet.

As a result of the distances arising between the permanent magnets on the one hand and the bearing shoulder on the other hand, the invention achieves a considerably more intensive turbulence than in the case of the treatment device in accordance with EP 0 277 112 A3.

One consequence of this is that the fuel passes through the magnetic fields at different flow rates, i.e. that the treatment takes place over a considerably greater spectrum of flow rates in combination with magnetic fields. Experiments have shown that fuels treated with the treatment device in accordance with the invention lead to a lower fuel consumption and a reduction in the total output of harmful waste gases from engines. This has so far been investigated with particular reference to diesel engines. One possible explanation for this effect is that the hydrocarbon chains are rendered more reactive by the treatment in the treatment device and some chains may possibly be broken.

One advantageous embodiment is characterised in that the conical part of the flow-chamber is formed from a separate insert, which is sealed from the remainder of the flow chamber by means of a sealing and cushioning ring. In this manner, the vibrations of the vehicle can be absorbed so that the movement of the fluid is not disturbed by these vibrations; also, the treatment device can be more easily dismantled for maintenance purposes.

The conical part is advantageously surrounded by a magnetic shield, especially if the actual housing of the treatment device is made from a non-ferromagnetic material such as plastic.

A further useful influence on the fuel is achieved if a disc made from conductive material is arranged at least at one end of the movable magnetic insert, whereby the electrochemical potential of the discs differs relative to each other or relative to other electrically conductive parts within the flow chamber.

One field-proven embodiment is characterised in that the magnetic insert exhibits four disc-shaped permanent magnets of which two inner magnets exhibit the same diameter, one outer magnet exhibits a larger diameter and one outer magnet exhibits a smaller diameter than the inner magnets. The desired turbulence is created as a result of the two bearing shoulders, and a long through-flow distance is achieved along the length of the two magnets of the same diameter.

One mechanically favourable design is characterised in that the magnetic insert exhibits a central sleeve onto which the permanent magnets are attached. In this case, it is useful for the discs made from conductive material also to be attached to the sleeve.

To achieve the best possible effect, the permanent magnets are magnetised axially, and the like poles of neighbouring permanent magnets are turned to face each other as required.

Another additional measure for influencing the fuel arises if one or more electrodes, which can be connected to an external electrical potential, are provided to create an electrical field gradient inside the flow chamber. In this case, it is possible to constrain the field gradients by means of an applied external voltage.

In one recommended embodiment, a nozzle for supplying gases, especially air, is provided up-stream from the flow-chamber. This can favour the combustion of the fuel, especially motor fuel.

To facilitate manufacture, the flow-chamber exhibits a circular cross-section, and the magnetic insert is designed to exhibit substantially rotational symmetry.

The invention is explained below with all its further advantages making reference to sample embodiments which are illustrated in the drawings.

DETAILED DESCRIPTION OF THE INVENTION

Figure 1:
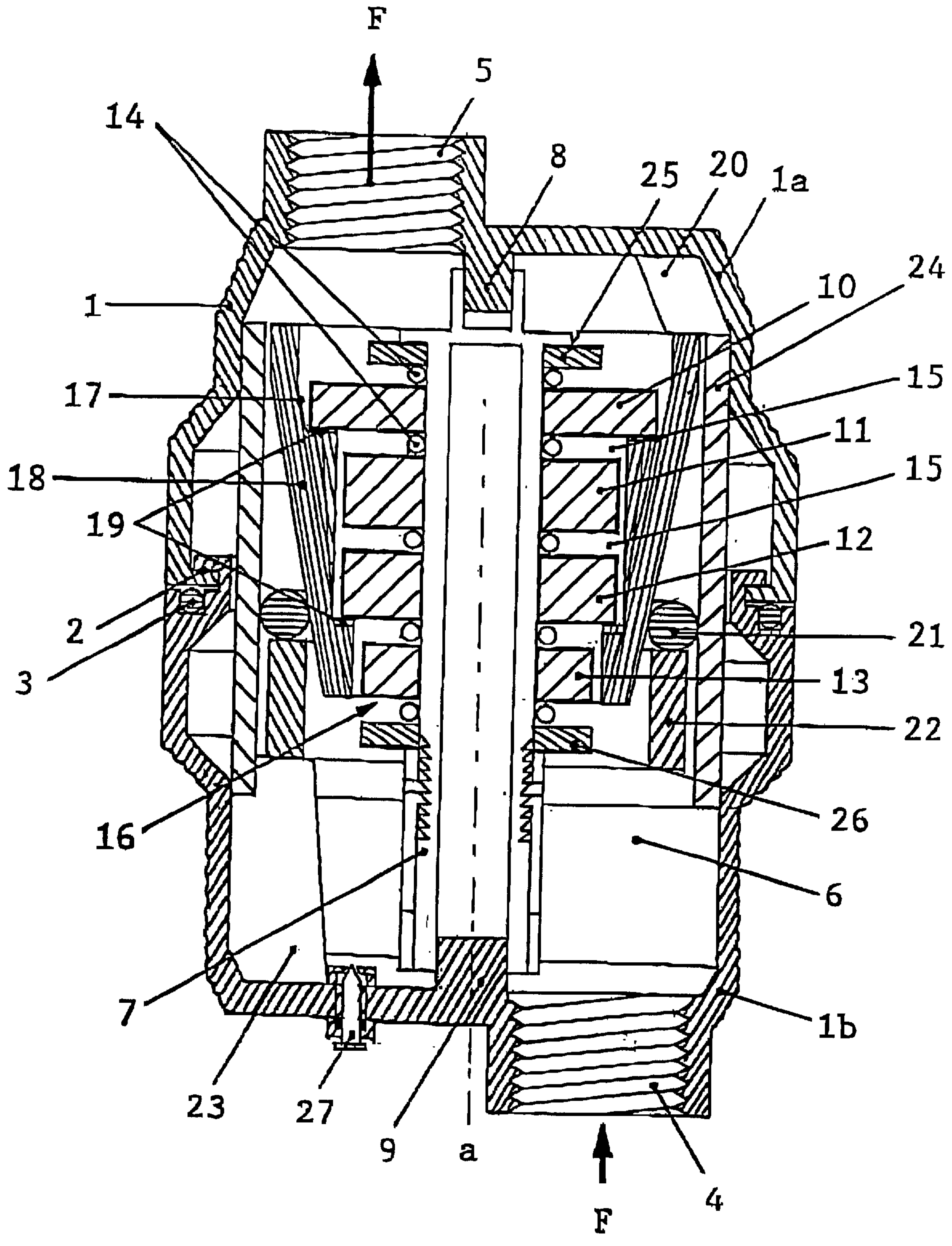
FIG. 1 shows a diagrammatic section through a magnetic treatment device in accordance with the invention and FIG. 2 shows another embodiment of a magnetic treatment device in accordance with the invention in partial section.

The embodiment of the invention shown in FIG. 1 has a housing 1 which consists of two housing halves 1*a*, 1*b* mutually connected by means of a bayonet connection 2 and a ring gasket 3. In this embodiment, the position illustrated can be regarded as the operating position so that the housing halves 1*a* and 1*b* can be described as the upper and lower halves respectively.

An essentially cylindrical flow-chamber 6, through which a fuel, especially a motor fuel such as diesel oil, can flow from bottom to top in the direction of the arrow F, is located between a standard lower pipe connecting piece 4 and a standard upper pipe connecting piece 5. Inside the chamber 6, a central, tubular sleeve 7 is mounted on an upper or lower cylindrical protrusion 8 or 9 respectively of the upper or lower housing half 1*a* or 1*b* so that it can be moved longitudinally.

The axis belonging to these parts is labelled with letter "a". Four annular, preferably single-piece, permanent magnets 10, 11, 12, 13 are attached to the central sleeve 7 with intermediate spacing rings 14, which may be made e.g. from plastic, but must be made from a non-ferromagnetic material, whereby the rings 14, which may also be discs, are positioned, as shown in FIG. 1, only in an inner section between the mutually facing surfaces of the magnets, so that annular gaps 15 are formed between these magnets 10,11, 12,13. The magnets are preferably magnetised axially, whereby the like poles may be mutually adjacent, and the uppermost magnet 10 has a larger diameter than the two central magnets 11, 12 (which have the same diameter), and these two magnets have a lager diameter than the lowest magnet 13. The magnetic insert 16 formed in this manner and mounted so that it can be moved, therefore exhibits an essentially conical shape and operates in a conical part 17 of the chamber 6. This conical part 17 is demarcated by a separate insert 18, which, at least inside, is essentially conical in shape and provides one bearing shoulder 19 each for the uppermost magnet 10 and the lower of the two central magnets 12.

The insert 18 is supported at the top by means of rib-shaped spacing elements 20. The bottom support is provided by a sealing and cushioning ring 21 positioned on a supporting ring 22. This in turn is supported at the bottom against the lower housing half 1*b* by means of rib-shaped spacing elements 23. The insert 18 is supported radially to the outside at the top directly by a tubular, magnetic shield 24; in the lower region, it is supported by this shield through the mediation of the sealing and cushioning ring 21. Towards the top, alongside the insert 18, the magnetic shield 24 is also supported against the upper housing section 1*a* via the rib-shaped spacing elements 20.

Above and below each of the permanent magnets 10, 11, 12, 13, a disc 25 and 26, respectively, made from a conductive material such as a metal, is attached to the sleeve 7. The electrochemical potential of the discs is different or differs with reference to the electronic potential of other, electrically conductive parts located inside the flow-chamber.

A nozzle 27, through which a gas, for example air, can be introduced into the flow-chamber 6, is screwed into the lower housing half 1*b*. With the help of a control unit not illustrated here, introduction of the gas can be adjusted automatically as required.

The magnetic treatment device in accordance with FIG. 1 may, for example, be connected between the fuel tank and the injection pump of a diesel engine in order to treat the diesel fuel in this manner.

The fuel enters through the connecting piece 4 and then flows upwards between the outer circumference of the permanent magnets 13, 12, 11, 10 and the interior wall of the insert 18 leaving the flow-chamber through connecting piece 5. The fuel flowing through the chamber raises the magnetic insert 16 to a greater or lesser extent depending on the quantity of flow. It is evident that, both in the regions between the individual magnets and especially in the region of the bearing shoulders 19, the fuel is subjected to strong turbulence and/or practically deflected through ninety degrees, thereby resulting in relatively high flow rates in the region of the stronger magnetic fields. Overall, a broad spectrum of flow rates is covered during flow through the treatment device thereby achieving an intensive treatment of the liquid and/or fluid motor fuel.

Additional electrochemical treatment of the fuel is possible if an electrical potential gradient is built up within the fluid, which can be achieved, for example through the discs 25 and 26, provided these are made from metals located at different positions in the sequence of electrochemical voltages. Alternatively, this voltage gradient can also be achieved between one or both discs and other electrically conductive parts inside the flow chamber. Apart from this passive production of an electrical field gradient, an electrical field gradient can also be achieved by electrodes to which different potentials are applied. To this end, external electrical lines can be connected to the electrodes from a battery.

The separate insert 18 is particularly advantageous because it allows spring-loaded, cushioned support via the ring 21 and because it can also be replaced easily if required. The magnetic shield 24 consists of soft magnetic material and is used to concentrate the field lines and also to guarantee shielding from inside to outside and from outside to inside.

Figure 2:
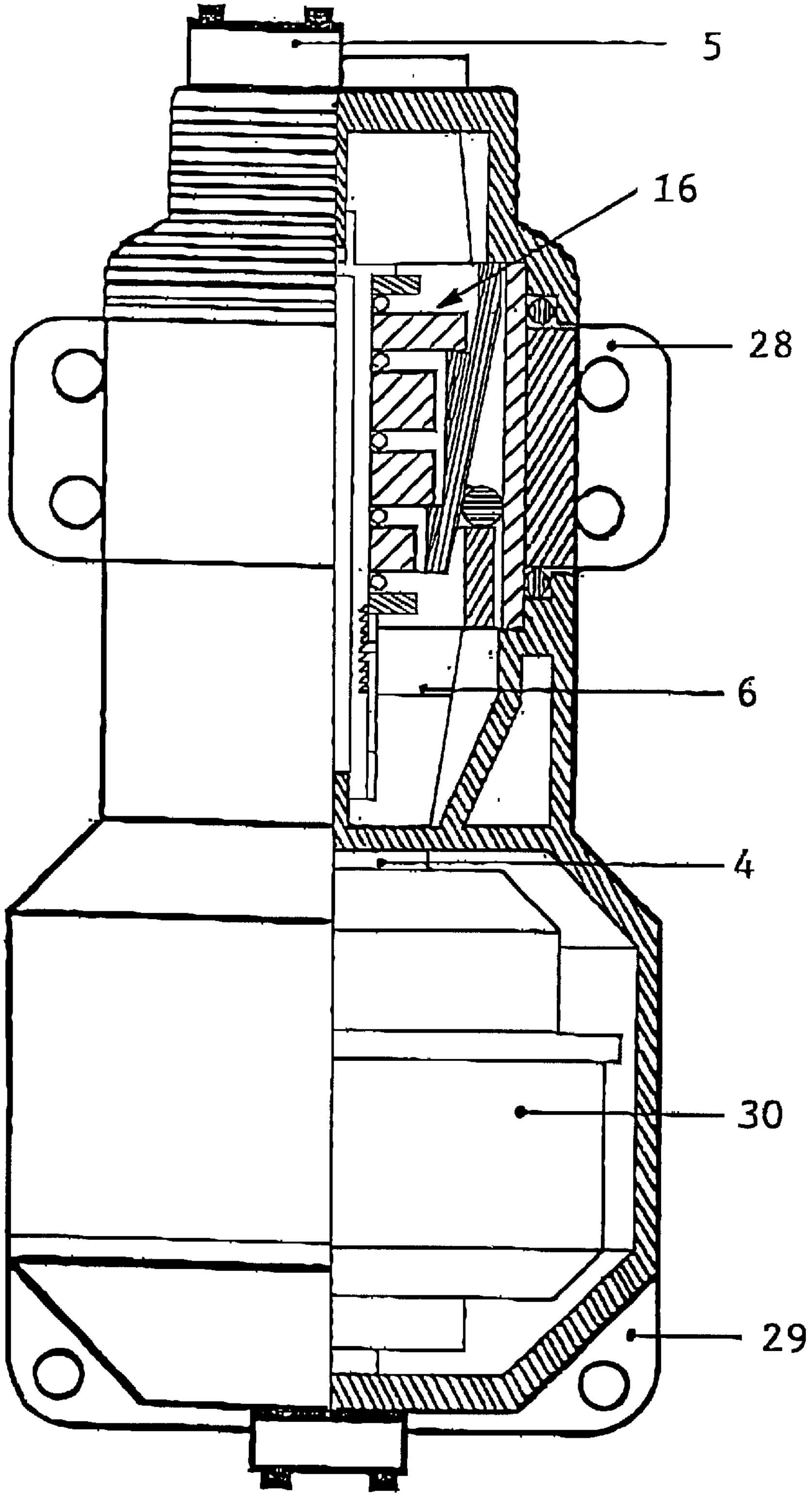

The embodiment shown in FIG. 2 corresponds in principal to the structure of the embodiment from FIG. 1. The treatment device exhibits mounting flanges 28, 29, with the help of which it can also be fitted additionally, at an appropriate position close to the engine, for example, of a passenger motor vehicle, heavy goods vehicle or motor boat. The lower pipe connecting piece 4 is positioned centrally in this case and leads to a fuel circulation pump 30 integrated with the housing, so that the fuel from the connecting piece 4 is fed from the pipe connecting piece 4 through the circulation pump 30 into the flow-chamber 6 and past the magnetic insert 16 to the outlet connecting piece 5. With this embodiment—and this also applies to the embodiment in accordance with FIG. 1—it is possible to arrange a fuel distributor after the outlet connecting piece 5, whereby part of the fuel is supplied to the actual fuel pump and to the injection pump or to a carburettor, whereas another part is fed back into the fuel tank. In this manner, a greater or lesser proportion of the fuel can be fed repeatedly through the treatment device.

Although the magnetic treatment device in accordance with FIGS. 1 and 2 is intended for vertical installation, this is not absolutely essential if another force is provided for re-setting the magnetic insert 16. A worm-spring which presses the magnetic insert away from one housing cover in the direction of the inlet connecting piece 4 may, for example, be used for this purpose. It is also possible to produce this force with a permanent magnet which operates with a magnet in the magnetic insert on the basis of a repulsive or attractive force. In both cases, the treatment device in accordance with the invention can, in principle, be installed in any position required.

What is claimed is:

1. Magnetic treatment device for fluid fuels comprising a body having a cylindrical flow chamber (6) defined in a conical part (17,18) widening in the direction of flow (A) and a generally conical magnetic insert (16) comprising at least two flat or annular permanent magnets (10,11,12,13), the permanent magnets being held axially at a distance from each other by means of spacing rings/discs (14) made from non-ferromagnetic material which are placed at mutually facing surfaces of the magnets, and the magnetic insert is held against the direction of flow with a force and is mounted in the region of the conical part in such a manner that it can be moved axially characterized in that the spacing rings/discs (14) made from non-ferromagnetic material are positioned only in an inner region between mutually facing surfaces of the permanent magnets (10,11,12,13) by being constructed with a short radial width between an inner circular surface and an outer circular surface which is significantly shorter that the radial width of adjacent annular magnets thereby to form a significant annular space between said mutually facing surfaces of the permanent magnets and radially outwardly from said outer circular surface of each ring/disc (14), and said conical part (17, 18) having at least one bearing shoulder (19) for seating at least one permanent magnet (10,12) in the wall of the conical part (17) of the flow chamber (6) such that said annular space and said at least one bearing shoulder (19) create higher flow speeds and/or cause turbulence in the region of the bearing shoulder (19).

2. Magnetic treatment device in accordance with claim 1, characterised in that the conical part (17) of the flow-chamber (6) is formed by a separate insert (18), which is sealed off from the remainder of the flow-chamber by means of a sealing and cushioning ring (21).

3. Magnetic treatment device in accordance with claim 1, characterised in that the conical part (17) is surrounded by a magnetic shield (24).

4. Magnetic treatment device in accordance with claim 1, characterised in that a disc (25,26) made from conductive material is arranged at least at one end of the movable magnetic insert (16), whereby the electrochemical potential of the discs differs mutually and/or relative to other electrically conductive parts inside the flow-chamber (6).

5. Magnetic treatment device in accordance with claim 4, characterised in that the discs (25,26) made from a conductive material are attached to the sleeve.

6. Magnetic treatment device in accordance with claim 1, characterized in that the magnetic insert (16) comprises a central sleeve (7) to which the permanent magnets (10,11, 12,13) are attached.

7. Magnetic treatment device in accordance with claim 1, characterized in that the magnetic insert (16) comprises a central sleeve (7) to which the permanent magnets (10,11, 12,13) are attached.

8. Magnetic treatment device in accordance with claim 1, characterised in that the permanent magnets (10,11,12,13) are magnetised axially.

9. Magnetic treatment device in accordance with claim 1, characterised in that the like poles of adjacent permanent magnets (10,11,12,13) face each other.

10. Magnetic treatment device in accordance with claim 1, characterised in that one or more electrodes capable of being supplied with an electrical potential for the production of an electrical field gradient are provided inside the flow-chamber (6).

11. Magnetic treatment device in accordance with claim 1, characterized in that a nozzle (27) is provided up-stream of the flow-chamber (6) for the introduction of gases.

12. Magnetic treatment device in accordance with claim 1, characterised in that the flow-chamber (6) exhibits a circular cross-section, and the magnetic insert (16) is of a substantially rotationally symmetrical structure.

13. Magnetic treatment device in accordance with claim 1, characterized in that each spacing ring or disc (14) is an O-ring (14).

* * * * *

UNITED STATES PATENT AND TRADEMARK OFFICE

CERTIFICATE OF CORRECTION

PATENT NO. : 6,361,689 B1
DATED : March 26, 2002
INVENTOR(S) : Jurgen Munzing

It is certified that error appears in the above-identified patent and that said Letters Patent is hereby corrected as shown below:

<u>Title page,</u>
"[30] Foreign Application Priority Data
Oct 22, 1997 (AU)..............1787/97" should be
-- [30] Foreign Application Priority Data
Oct 22, 1997 (AT)................1787/97 --

<u>Column 1,</u>
Line 13, "fiat" should be -- flat --;

<u>Column 2,</u>
Lines 16 and 38, "flow chamber" should be -- flow-chamber --;
Line 17, "field-proven" should be -- field proven --;

<u>Column 3,</u>
Line 13, ";labelled" should be -- labeled --;
Line 27, "lager" should be -- larger --;

<u>Column 4,</u>
Line 18, "flow chamber" should be -- flow-chamber --;
Line 27, "carburettor" should be -- carburetor --;

<u>Column 5,</u>
Line 1, after "flat" delete -- or --;
Line 3, "rings/discs" should be -- ring or disc --;

Signed and Sealed this

Twenty-seventh Day of August, 2002

*Attest:*

JAMES E. ROGAN

*Attesting Officer* — *Director of the United States Patent and Trademark Office*